United States Patent [19]
Fleytman

[11] Patent Number: 6,093,126
[45] Date of Patent: *Jul. 25, 2000

[54] TRANSMISSION DEVICE

[76] Inventor: Yakov Fleytman, 3233 Hickey Dr., Orion, Mich. 48359

[ * ] Notice: This patent is subject to a terminal disclaimer.

[21] Appl. No.: 09/407,711

[22] Filed: Sep. 28, 1999

Related U.S. Application Data

[63] Continuation-in-part of application No. 08/732,150, Oct. 16, 1996, Pat. No. 5,992,259, and a continuation-in-part of application No. 08/791,466, Feb. 10, 1997.

[51] Int. Cl.⁷ .................................................. F16H 48/06
[52] U.S. Cl. ............................ 475/228; 475/226; 74/425
[58] Field of Search .............................. 74/425; 475/226, 475/227, 228, 229

[56] References Cited

U.S. PATENT DOCUMENTS

| | | |
|---|---|---|
| Re. 33,278 | 7/1990 | Johnshoy . |
| 2,225,957 | 12/1940 | Korf . |
| 2,583,140 | 1/1952 | Else . |
| 3,208,305 | 9/1965 | Butterbaughrs . |
| 3,220,284 | 11/1965 | Horvath . |
| 4,020,715 | 5/1977 | Sollars . |
| 4,346,728 | 8/1982 | Sulzer . |
| 4,973,295 | 11/1990 | Lee . |
| 4,987,781 | 1/1991 | Nakahashi . |
| 4,987,788 | 1/1991 | Busch . |
| 5,015,898 | 5/1991 | Frey . |
| 5,033,996 | 7/1991 | Frey . |
| 5,136,888 | 8/1992 | Nix . |
| 5,333,517 | 8/1994 | Bryson . |
| 5,992,259 | 11/1999 | Fleytman ................................. 74/425 |

FOREIGN PATENT DOCUMENTS

| | | |
|---|---|---|
| 1399721 | 11/1986 | U.S.S.R. . |
| 1437212 | 4/1987 | U.S.S.R. . |
| 1442983 | 4/1987 | U.S.S.R. . |
| 1486686 | 11/1987 | U.S.S.R. . |
| 1495110 | 11/1987 | U.S.S.R. . |

*Primary Examiner*—Khoi Q. Ta

[57] ABSTRACT

Transmission device utilizes a self-locking enveloping worm (1) and enveloping type worm gear (2) in combination with differentials. The worm gear has less than 24 teeth and enveloping angle one revolution of worm thread more than 15 degrees. Mechanical motion from the input of one member (4) of the differential is transmitted to the output (5) of another member of the differential. Control member of the differential connected to the worm gear. Unlocking motion of worm gear (2) controlling by rotation of enveloping worm, connected to auxiliary motor (17). The transmission device for transmitting an oscillating input (4) to a single directional output (5) incorporates some of the worm and worm gear combinations with spider or bevel differentials. The usage of this invention not only transmits the rotation utilizing an oscillating input but also transmits the torque for the conventional power transmission. For example, this system can be utilized as part of a vehicle transmission or a gearbox with changeable ratio.

16 Claims, 7 Drawing Sheets

TRANSMISSION DEVICE

This is a continuation-in-part of Ser. No. 08/732,150, Filed Oct. 16, 1996, now U.S. Pat. No. 5,992,259 and is a continuation-in-part of U.S. Ser. No. 08/796,466, Filed Feb. 10, 1997.

BACKGROUND OF THE INVENTION

This invention relates to a combined transmission systems that transmit input mechanical power into direction output.

For this purpose the are two main system available in previous art:

Mechanical oscillating energy transmits to the input, and than transmission device provides a unidirectional energy to the output.

Continues unidirectional mechanical energy transmits to the input and transmission device changes speed to output. We can make analogy with electrical energy, where two sources of energy: direct and alternative current available, but electric motor using this energy, has unidirectional motion.

In transmitting oscillation energy the prior art transmissions have not successfully transmitted high torque levels. One common type of transmission device is a one-way clutch. In these known systems: such as in U.S. Pat. No. 5,333,517 by Rodney Bryson, Aug. 2, 1994, rollers or other drive members are engaged within notches or openings in a driven member. The rollers engage and move the driven member when rotation is transmitted in a first direction, but will slip when rotation is transmitted in a second direction. The invention disclosed in U.S. Pat. No. 5,333,517 has a ratio between the worm and worm gear of 5, however, the number of threads on the worm is more than one, and the worm does not have a self locking feature. These types of clutches have enjoyed wide usage, but have been unable to transmit high torque loads. One proposal suggests using a pair of such clutches with an oscillating input to perform as a part of a vehicle transmission. Due to the low torque load, this system would be impractical. A main disadvantage of these types of clutches is a discrete characteristic of changing of contact. It leads to mechanical shocks during every new contact between driving and driven elements. Drive systems for providing speed in a single rotational direction from a reversible input are also well known (U.S. Pat. No. 5,333,517 by Rodney Bryson, Aug. 2, 1994). But this system has a gear train with some backlashes and it is not able to provide small amplitude of vibration. Besides, the input and output shafts are perpendicular to each other, and therefore, this drive system cannot be used in many applications.

In one system disclosed in a Soviet inventor certificate number 1,486,686 (1989) granted to the inventor of this invention, a self-locking transmission is utilized to transmit rotation. In the disclosed system, a worm and a worm gear combination are utilized to transmit rotation. The rotation is transmitted utilizing the engaged teeth and thread of the gears such that there is not relative movement between the two gear members during this rotation. With such a system, many valuable benefits result. In particular, one is able to accurately and efficiently transmit rotation through the self-locking transmission. A main advantage of these types of clutches is continuous contact between the driving and driven elements.

In addition, the standard power supply utilized with such systems has difficulty allowing any of the structure to freely turn about 360 degrees. Instead, electrical supply lines have typically limited the operative members to a restricted range of rotation. This is, of course, undesirable.

In transmitting continues unidirectional energy and change the ratio by using self-locking properties of worm/ worm gear transmission in the prior art t are different modifications.

In general, prior art using combinations of strait worm and gear with combinations of differential means.

Examples of these transmissions are in U.S. Pat. No. 2,583,140, to Else; U.S. Pat. Nos. 2,225,957 to Korff, 3,208,305 to Butterbaugh, U.S. Pat. No. 4,346,728 to Harry; U.S. Pat. No. 4,917,200, to Lucius; U.S. Pat. No. 4,346,728, to Sulzer, U.S. Pat. No. 4,987,788 to Bausch; U.S. Pat. No. 4,973,295, to Lee; U.S. Pat. No. Re. 33,278, to Johnshoy; U.S. Pat. No. 3,220,284, to Horvath; U.S. Pat. No. 5,033, 996, to Frey; U.S. Pat. No. 5,015,898, to Frey.

To have a self-lock is better to use worm with only one thread, it makes lead angel smaller. In previous art with a strait worm it was possible by making only more than one revolution of the thread. It is why only two worm gear teeth and threads were in a mesh. When total worm gear teeth more than 24 it makes each tooth small and limits load capacity. Minimum ratio in previous art for ratio with one thread is 24, but to able to control motion of the worm its speed became in 24 times greater than speed of the worm gear. It is why previous art was noir realized in any reasonable real transmissions. Increasing size of the worm pitch diameter to make comparable with worm gear pitch diameter was also unpractical, because it makes very small threads relatively to the big body of the worm. Using of standard double enveloping worm/worm gear having more than 24 worm gear teeth and enveloping angle for one revolution of a worm thread less than 15 degree has the same problem: small and weak teeth, high ratio, more 24. Enveloping worm has a middle part and periphery part. The middle part in mesh with worm gear on the top of the worm gear. The periphery part in mesh with the periphery worm gear on the side of the worm gear. To provide self-lock better to increase periphery mesh between worm and worm gear. But standard enveloping worm has only mesh on the top the worm gear. Increasing periphery mesh leads to more than 3 teeth in contact for single thread. But it makes difficult to assemble a worm with a worm gear and still has the same problem.

The term "self-locking" as is utilized in this application to describe the inventive worm and worm gear combination requires that the teeth of the worm gear when in contact with the thread of the worm are incapable of rotating the worm about its axis. By carefully selecting the material of the respective teeth and threads, and the respective angles, a worker of ordinary skill in the art would be able to achieve this goal.

There are some deficiencies in the system disclosed in the prior inventor's certificate, however, and this invention and a parent patent applications of the same inventor, Ser. No. 08/732,150, Filed Oct. 16, 1996 entitled "Worm/Wormgear Transmission And Apparatus For Transmitting Rotating Utilizing An Oscillating Input" and Ser. No. 08/796,466, Filed Feb. 10, 1997 entitled "Apparatus For Transmitting Rotation Utilizing an Oscillating Input" disclose improvements to the prior art systems.

SUMMARY OF THE INVENTION

The present invention describes the effect of "self-lock" between a worm and worm gear, which is used for designing a one-way clutch. Typically, in previous art, free motion of a worm has been provided by an electric motor. This is important for the purpose of variable speed and reversing the direction of transferring torque, but the worm has to rotate effectively at a rate, which is equal to the ratio of the gear teeth and thread of the worm gear and worm.

An auxiliary motor is preferably mounted on the rotor, and rotates the worm relative to the worm gear to either hold the worm gear to its original position, or allow the worm gear to move relative to the worm when an oscillating input is utilized. When subjected to an oscillating input, the worm and rotor act as a mechanical diode, resulting in a single direction output. When we use the motor to unlock the worm gear by the worm, the system acts as a mechanical amplifier.

In describing different versions of transmission devices, the base of the design is a grounded worm. Due to this, there is no problem connecting the electrical connections to the operative members even when the operative members freely rotate more than 360 degrees. Balancing of the rotor also becomes easy. Versions of designs with a worm gear attached to the different members of the spider differentials and bevel differentials are the foundations of the invention. Transmissions device with differentials, having different ratios are variations of these designs. The usage of this invention not only transmits the rotation utilizing an oscillating input but also transmits the torque for the conventional power transmission. For example, this system can be utilized as part of a vehicle transmission or a gearbox with changeable ratio.

These and other features of the present invention may be best understood from the following specification and drawings, of which the following is a brief description.

DETAILED DESCRIPTION OF PREFERRED EMBODIMENTS

Figure 1:
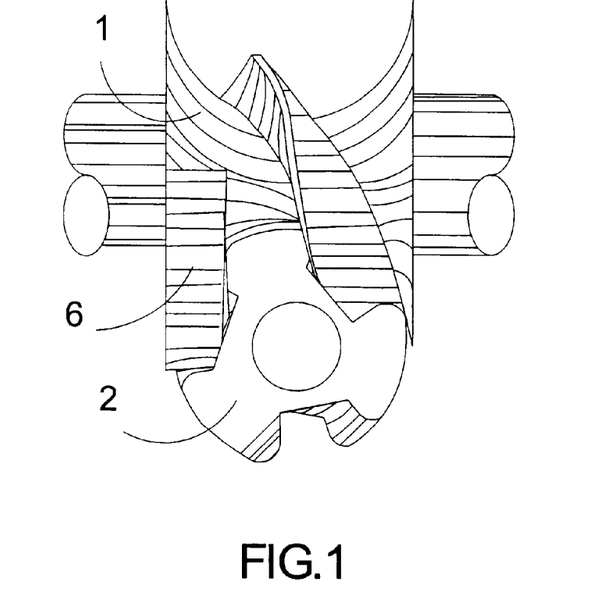
FIG. 1 is a cross-sectional view of a worm/worm gear with 3 teeth incorporating the present invention.

A typical example of the enveloping worm with worm gear is illustrated in FIG. 1. A Transmission device comprising an enveloping worm 1 having at least one screw thread 6 engaged by a worm gear 2 and enveloping type of worm gear 2 with number of gear teeth less than 24. Said enveloping angle of said worm 1 is greater than 15 degrees for one revolution of said thread of said enveloping worm so that said thread 6 extends from top of the said worm gear to periphery of said worm gear. Enveloping angle is angle between ends of the worm thread defined with reference to the center of the worm gear. Said worm 1 and worm gear 2 are self-locking against driving from said worm gear 2.

That thread 6 of said worm 1 is engaged by at least one tooth of an enveloping type worm gear 2 with six teeth. As shown in FIG. 1, the enveloping worm 1 has a single thread 6 in a preferred embodiment. The worm gear 1 has three teeth spaced about the circumference of the worm gear 2. Because of less than 24 worm gear teeth, possible to increase size of the worm pitch diameter to make it comparable with worm gear pitch diameter.

The worm gear 2 and worm 1 are enclosed in the housing (not showed). Usually housing is made from metal and has forms a reservoir for a lubricant to both lubricates the gears, bearings, and seals to serve as a coolant for the unit. The housing forms a rigid support to mount the gears, bearings, seals and their associated parts (not showed in FIG. 1).

The worm 1 wraps around the worm gear 2, and enveloping worm gear 2 also wraps around the worm 1. The minimum ratio between the number of worm gear 2 teeth and one worm 1 thread 6 is 2 (two). Apposite, by rotation of the worm gear 2 worm 1 rotates with higher speed.

Reason to use enveloping type of worm gear is that this type of worm gear has natural profile of tooth surface, which distinct from another types of thread followers. When worm gear teeth generated by thread of worm having different length for the same enveloping angle (shortened), profile of worm teeth is different. The main advantage enveloping type of worm gear is more capacity. For better torque capacity and better self-lock enveloping type of worm gear could has different enveloping angle. Adding envelope to the worm gear is necessary only for the bigger capacity but in most applications is enough to have only enveloping worm.

Figure 2:
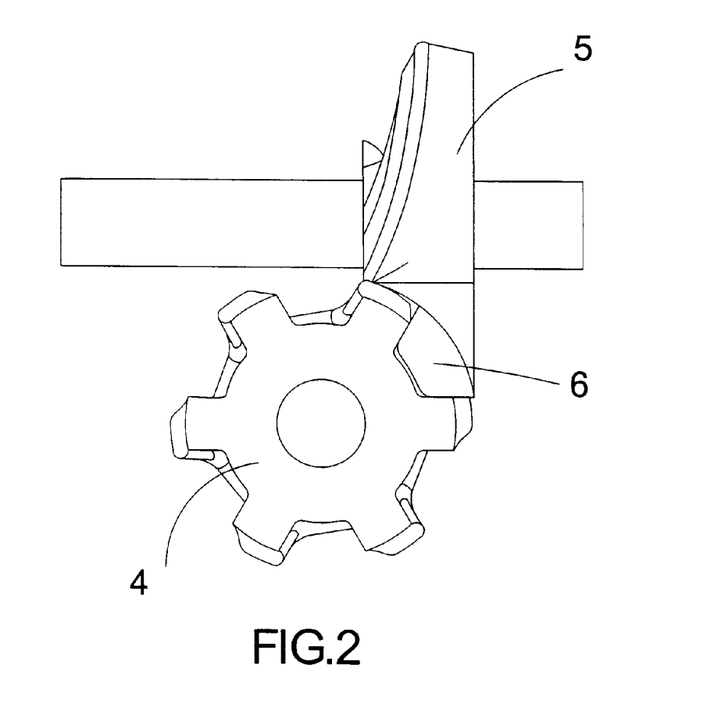
FIG. 2 is a cross-sectional view of an enveloping part of split worm with 6 teeth worm gear.

This invention because of bigger enveloping angle of one revolution of worm thread makes more percentage of geometric lack than friction lock. For bigger enveloping angle easy to access mesh on the periphery of the worm gear. For purpose of self-lock better to eliminate middle part of the worm in mesh with the worm gear on the top of the worm gear by using part of split worm 1. It allow reduce the surface friction of worm and worm gears and provide unlocking worm gear motion by rotating the worm with less power. This increases efficiency of performance. FIG. 2 is a part of split worm 1, where 7 are the worm and 8 is the gear with 6 teeth.

To have a self-lock is better to use worm with only one thread, it makes lead angel smaller. This invention comprises means for rotating said worm 1 about its axis of rotation relative to said worm gear 2 to provide unlocking motion.

Said means can be the auxiliary motor 4 or servo drives (not shown on picture 2).

Figure 3:
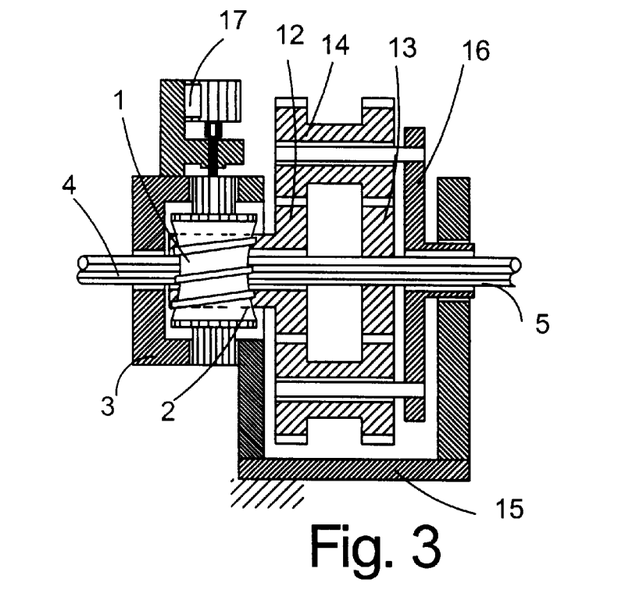
FIG. 3 is a cross-sectional view of a spider differential with a sun gear being connected to a worm gear incorporating the principles of the present invention.

Said worm gear 1 being connected to one member of a differential gear set wherein two other. As illustrated in FIG. 3, the differential gear set is a spider differential comprising sun gears 12, 13 with a spider gear 14, a housing 15 and a carrier 16 wherein the sun gear 12 is connected to the worm gear 3. For simplicity of illustration, the drive means is the auxiliary motor 17.

Figure 4:
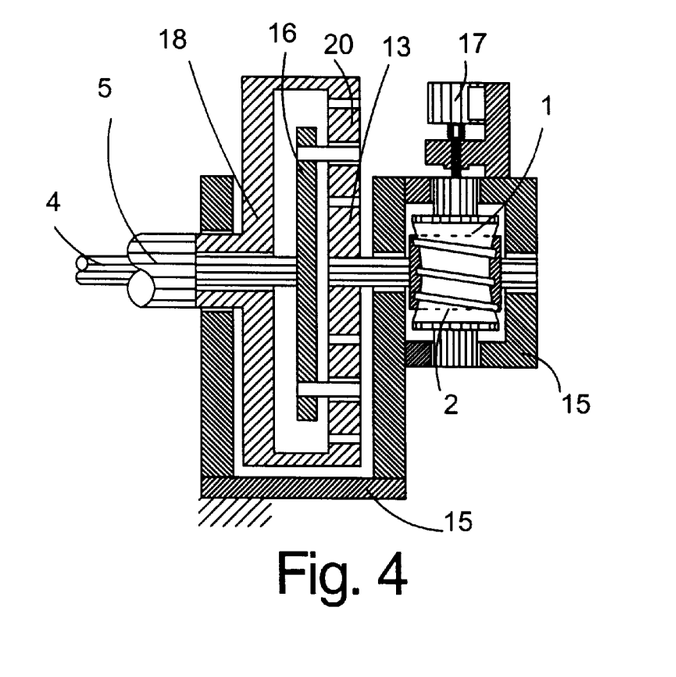
FIG. 4 is a cross-sectional view of the spider differential comprising a ring gear with the sun gear being connected to the worm gear.

As illustrated in FIG. 4, the differential gear set is a spider differential comprising a sun gear 13, a ring gear 18 with a spider gear 20, a housing 15, and a carrier 16 wherein the sun gear 13 is connected to the worm gear 3.

Figure 5:
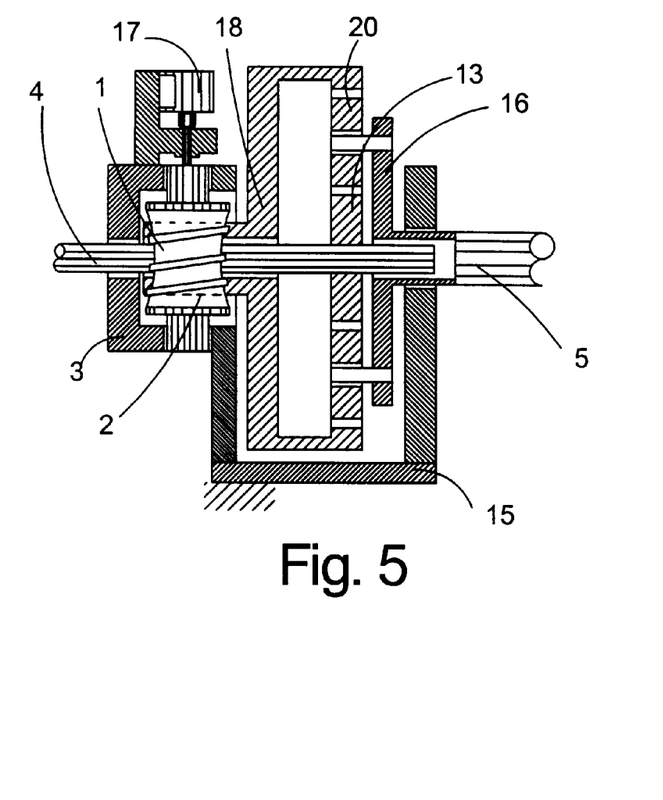
FIG. 5 is a cross-sectional view of the spider differential with the ring gear being connected to the worm gear.

As illustrated in FIG. 5, the differential gear set is a spider differential comprising a sun gear 13, a ring gear 18 with a spider gear 20, a housing 15, and a carrier 16 wherein the ring gear 18 is connected to the worm gear 3.

Figure 6:
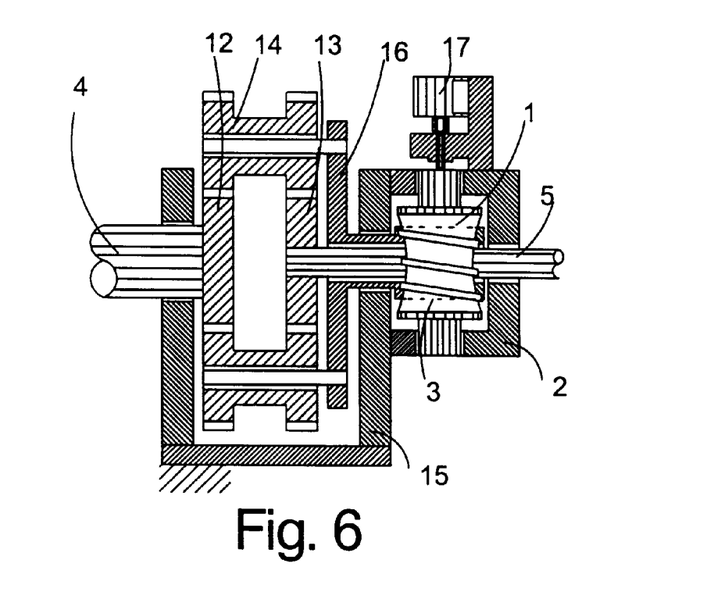
FIG. 6 is a cross-sectional view of the spider differential with the carrier being connected to the worm gear.

As illustrated in FIG. 6, the differential gear set is a spider differential comprising sun gears 12, 13 with a double spider gear 14, a housing 15, and a carrier 16 wherein the carrier 16 is connected to the worm gear 3.

Figure 7:
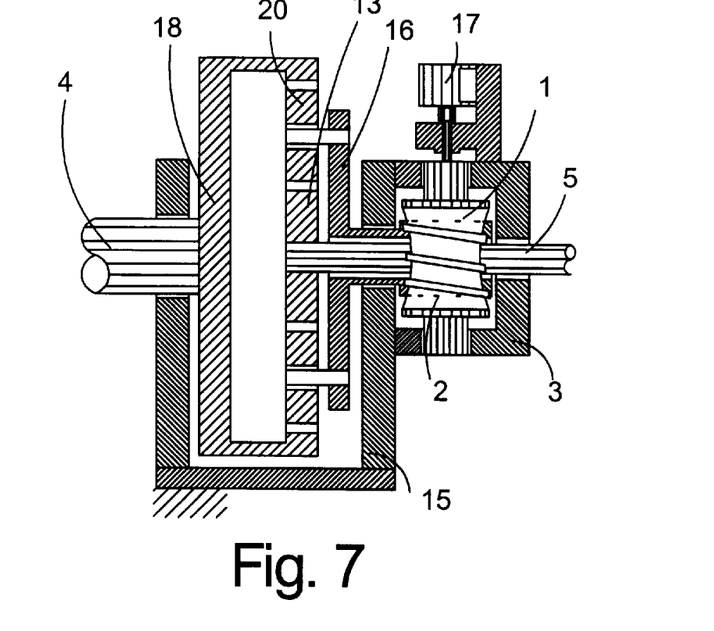
FIG. 7 is a cross-sectional view of the spider differential comprising the ring gear with the carrier being connected to the worm gear.

In an example illustrated in FIG. 7, the differential gear set is a spider differential comprising a sun gear 13, a ring gear 18 with a spider gear 20, a housing 15, and a carrier 16 wherein the carrier 16 is connected to the worm gear 3.

Figure 8:
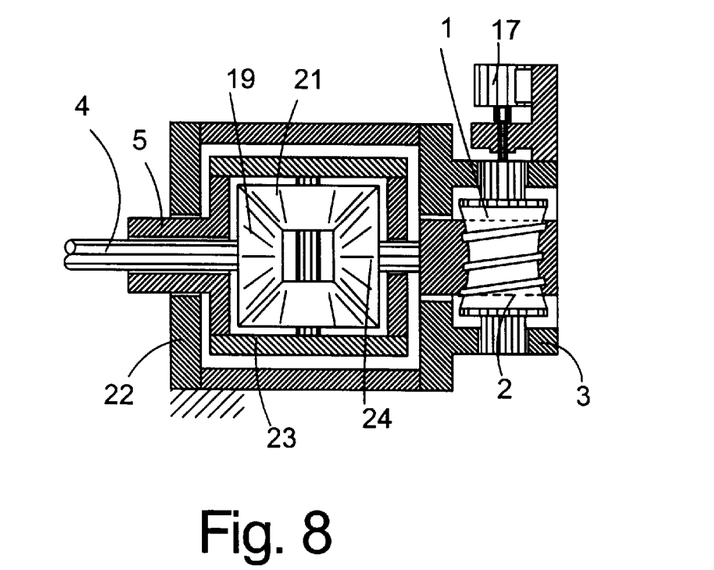
FIG. 8 is a cross-sectional view of a bevel differential with a bevel gear being connected to the worm gear.

As illustrated in FIG. 8, the differential gear set is a bevel differential comprising bevel gears 19, 24 with an idler bevel gear 21, a housing 22 and a carrier 23 wherein the bevel gear 24 is connected to the worm gear 3.

Figure 9:
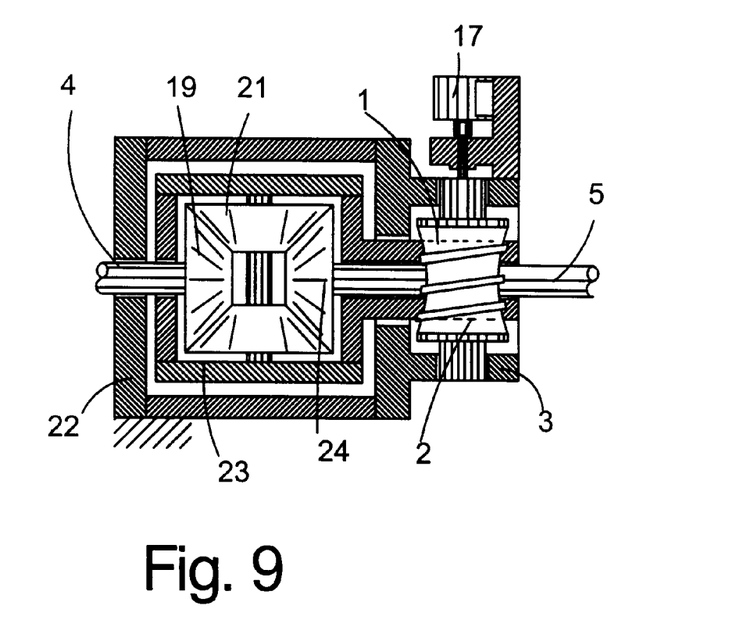
FIG. 9 is a cross-sectional view of the bevel differential with a carrier being connected to the worm gear.

As illustrated in FIG. 9, the differential gear set is a bevel differential comprising bevel gears 19, 24 with an idler bevel gear 21, a housing 22 and a carrier 23 wherein the carrier 23 is connected to the worm gear 3.

To change the ratio of the transmission or to reverse the direction of rotation, a pair of worms 1 and 25 with the rotors 2 and 2', with each of the worm gears 3, 26 can be driven by independent shafts 4 and 5 and have a differential for connecting the worm gears with members of the differential.

Figure 10:
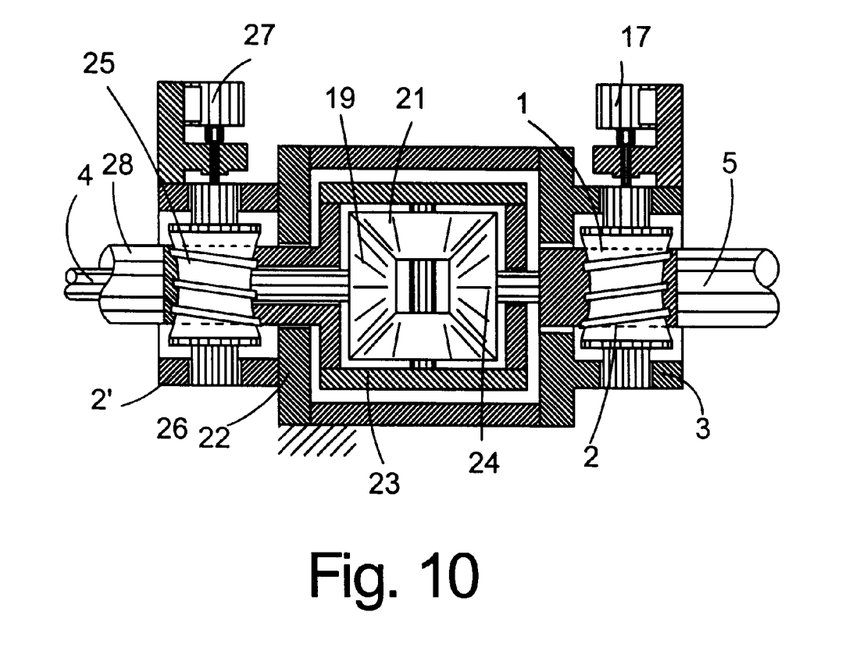
FIG. 10 is a cross-sectional view of the bevel differential with the carrier being connected to the second worm gear and the bevel gear being connected to the first worm gear.

As illustrated in FIG. 10, the differential gear set is a bevel differential comprising bevel gears 19, 24 with a spider bevel gear 21, a housing 22 and a carrier 23 wherein the carrier 23 is connected to the worm gear 3. Bevel gear 24 is connected to the worm gear 3. An extra shaft 28 can provide an opposite direction of rotation. For simplicity, the drive means are auxiliary motors 17 and 27.

Figure 11:
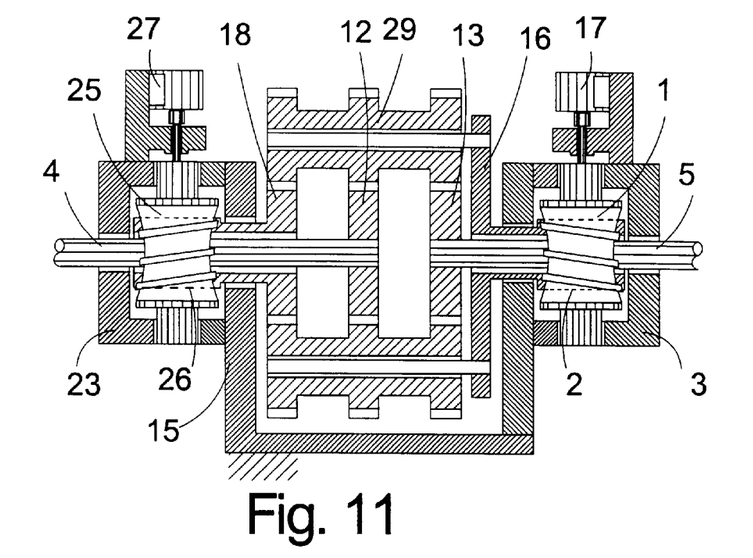
FIG. 11 is a cross-sectional view of the spider differential with the carrier being connected to the first worm gear and the sun gear being connected to the second worm gear.

As illustrated in FIG. 11, the differential gear set is a spider differential comprising sun gears 12, 13, 18 with a spider gear 29, a housing 15 and a carrier 16 wherein the sun gear 18 is connected to the second worm gear 26, and the carrier 16 is connected to the first worm gear 3. For simplicity, the drive means are auxiliary motors 17 and 27.

Figure 12:
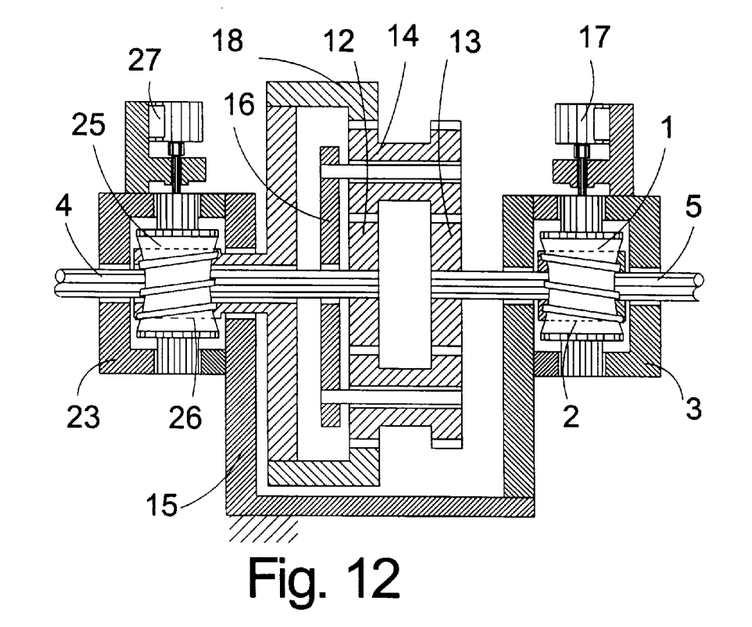
FIG. 12 is a cross-sectional view of the spider differential with the sun gear being connected to the first worm gear and the ring gear being connected to the second worm gear.

As illustrated in FIG. 12, the differential gear set is a spider differential comprising sun gears 12, 13 and a ring gear 18, a housing 15, a spider gear 14 and a carrier 16 wherein the sun gear 13 is connected to the first worm gear 3 and the ring gear 18 is connected to the second worm gear 26. For simplicity the drive means are auxiliary motors 17 and 27.

Figure 13:
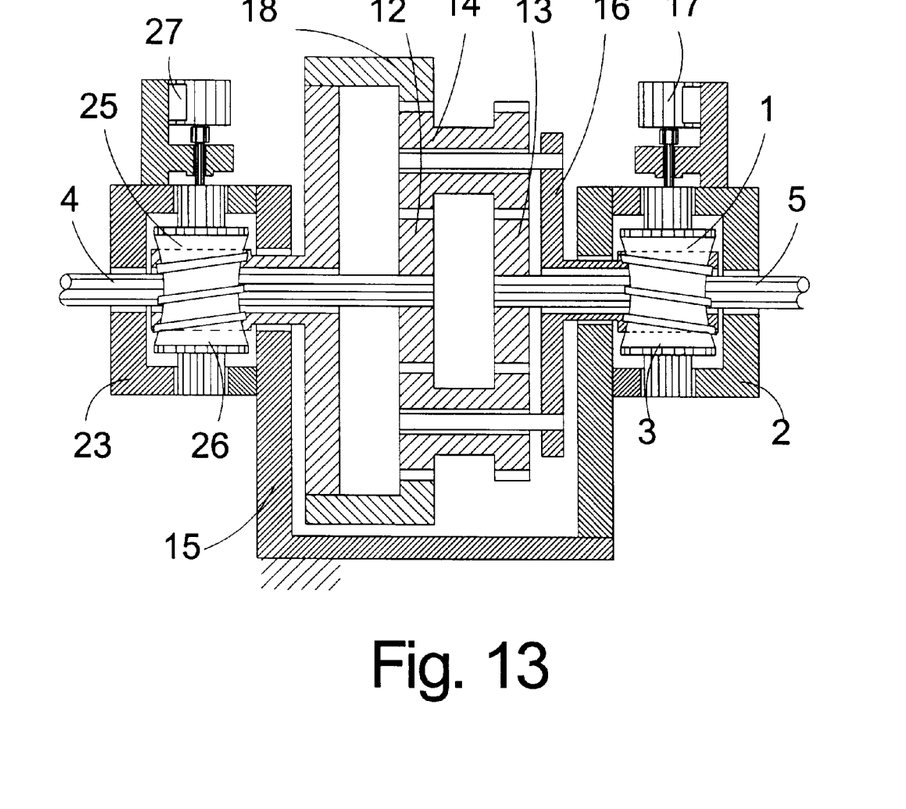
FIG. 13 is a cross-sectional view of the spider differential with the carrier being connected to the first worm gear and the ring gear being connected to the first worm gear.

As illustrated in FIG. 13, the differential gear set is a spider differential comprising sun gears 12, 13 and a ring gear 18, a housing 15, a spider gear 14 and a carrier 16 wherein the carrier 16 is connected to the first worm gear 3 and the ring gear 18 is connected to the second worm gear 26. For simplicity the drive means are auxiliary motors 17 and 27.

Figure 14:
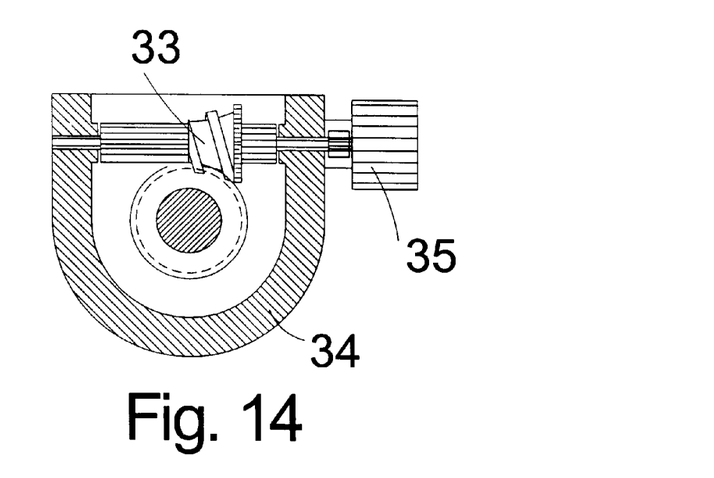
FIG. 14 is a cross-sectional view of the worm gear with the teeth engaging the thread on the part of a split worm.

FIG. 14 discloses a half worm 33 enclosed in the rotor 34 and an auxiliary motor 35.

Most preferably, the ratio between worm and worm gear is less than 12. It is possible that only 2 teeth need to be utilized on the worm gear 3.

Since the worm and worm gears are not utilized as in standard gears to have interengaging teeth and threads, the material selected for the members is different than that which has been utilized in the past. In the past, the worm and worm gears have been formed of materials having low coefficients of friction and a lubricant is typically utilized. In this invention, lubricant would not be needed. Moreover, the worm and worm wheel are made from a strong material such as steel. The shape of the teeth and threads and the worm and worm gears are designed to achieve a self-lock feature. The simple profile of the worm is strait sided, like in standard double enveloping gearings, but also could be different. For example it could be involute profile. Profile of the worm gear is result of generation blank worm gear by the profile of the worm. Even though a worker of ordinary skill in the art would recognize these designs, he would come within the scope of this invention.

In addition, a material that actually increases the friction may be placed on the teeth and threads. Again, it is a goal to achieve the self-locking property, rather than any smooth movement between the worm and the worm gear. The reduction of the number of teeth on the worm gear also reduces the inertia of the worm gear, thus increasing the speed at which the worm gear can shift between its oscillating inputs. Its function is to turn the worm without any interaction relative to the teeth of the worm gear and to stop under overload even when the worm is fixed by the worm gear. Thus, a high torque motor needs not be utilized. For that reason, only a low amount of electrical energy is required to. Examples of deferent differentials connected to the worm gear are shown in FIG. 3–FIG. 9. When invention using to change a ratio in transmission, the self-lock with high percentage of geometric lock also not required high power of a motor.

FIG. 3 and FIG. 6 describe transmissions for transferring positive/negative rotation of the input shaft 4 with different torque or disconnecting the output shaft 5 from the input shaft 4. The ratio depends on the number of teeth in gears 12 and 13.

FIGS. 4, 5 and 7 describe transmissions for changing the direction of rotation from the input shaft 4 with a different torque or disconnecting the output shaft 5 from the input shaft 4. The ratio depends on the number of teeth in gears 18 and 13.

FIGS. 8 and 9 describe transmissions for changing the direction of rotation with the same torque or disconnecting the output shaft 5 from the input shaft 4.

When adding the pair of worms 1 and 25, rotors 2 and 23 with the means (auxiliary motor 17 and auxiliary motor 27 and the worm gear 3 and the worm gear 26 with each of the worm gears being driven by an independent input shaft to a differential for connecting the worm gears with the members of the differential, we are able to change the ratio from the first number to the second number or to change the direction of rotation.

FIG. 10 discloses a transmission for changing the direction of rotation from the shaft 4 to shafts 5 or 29 or disconnecting the output shaft 5 from the input shaft 4. When the worm 1 holds the worm gear 3, then the shaft 28 has the direction of rotation of the input shaft 4. When worm 25 holds worm gear 26, the shaft 5 has an opposite direction of rotation from the input shaft 4.

FIGS. 11–13 disclose the designs of a transmission with a ratio of 1 (one) for connecting the input shaft 4 with the output shaft 5, when the worm 25 holds the worm gear 26. Also, these designs are used for changing the ratio between the input 4 and the output 5 when the worm 1 holds the worm gear 3 or disconnecting the input shaft 4 from the output shaft 5 when the worm gear 3 and the worm gear 26 are free. By combination of the transmission devices described in FIGS. 3–13 we can make many different transmissions. When the enveloping worm has an angle of envelop of more than 45°, assembling the worm with a gear becomes complicated. Using only part of a split enveloping worm along the axis of its rotation makes assembling simple (FIG. 14). Figures from FIG. 3 to FIG. 13 could be also with a part of a split worm.

All of the above-described designs show that a transmission device may be utilized to transmit the oscillating input on the shaft 4 into a single directional rotation on the output shaft 5 but also have more functions to compare with the prior art. For using invention to regulate speed in transmission it based on the principal of differential systems. These systems have three members: input and output and a control member. Combination of connecting these members with the worm gear has different performance and characteristics. Input power goes from input to output of the differential. Control member under internal reaction. When an input of a differential connected to constant speed of source unidirectional mechanical energy, the output speed depends from a speed of the control member of the differential. To provide motion of the control member auxiliary motor unlocks the worm gear by rotating the worm in direction with internal reactions on the worm (not against directions of internal reactions). Unlocking motion of the worm gear under load neither does nor required much power, compare to power transmitted from the input to the output of the differential. Low ratio enveloping worm and worm gear don not require much power for auxiliary motor.

The new invention described above has some advantages:
for transmitting oscillation motion it provides the fast reverse of a movement of the output shaft by changing the direction of rotation by an auxiliary motor; it requires little or no lubrication between the working parts because a worm and a worm gear have relative motion only when the worm is unloaded and eliminated of backlash between the worm gear and the worm;
for speed regulation in variable speed transmission it allow lubrication between the working parts without losing self-locking that increases efficiency by reducing power to provide unlocking motion of the worm.

Several embodiments of the present invention have been disclosed. A worker of ordinary skill in the art would recognize that certain modifications would come within the scope of this invention. For that reason, the following claims should be studied to determine the true scope and content of this invention.

What is claimed is:

1. A transmission device having a worm/worm clutch unit comprising:
an enveloping type of worm gear with number of gear teeth less than 24;
an enveloping worm having at least one screw thread engaged by a worm gear;
wherein said enveloping angle of said worm is greater than 15 degrees for one revolution of said thread of said enveloping worm so that said thread extends from top of the said worm gear to periphery of said worm gear.
wherein said worm and worm gear are self-locking against driving from said worm gear;
means for rotating said worm about its axis of rotation relative to said worm gear to provide unlocking motion;
said worm gear being connected to one member of a differential gear set;
wherein two other members of said differential gear set provide an input and an output.

2. The transmission device as recited in claim 1, wherein said differential gear set is a differential comprising two sun gears with one sun gear connected to said worm gear.

3. The transmission device as recited in claim 1, wherein said differential gear set is a differential comprising a ring gear and a sun gear with the sun gear connected to said worm gear.

4. The transmission device as recited in claim 1, wherein said differential gear set is a differential comprising a ring gear and a sun gear with the ring gear connected to said worm gear.

5. The transmission device as recited in claim 1, wherein said differential gear set is a differential comprising a ring gear and a sun gear with a carrier of the differential connected to said worm gear.

6. The transmission device as recited in claim 1, wherein said differential gear set is a bevel differential with one bevel gear connected to said worm gear.

7. The transmission device as recited in claim 1, wherein said differential gear set is a bevel differential with a carrier connected to said worm gear.

8. The transmission device as recited in claim 1, wherein said differential gear set is a differential comprising two sun gears with a carrier of the differential connected to said worm gear.

9. A transmission device having a worm/worm unit comprising:
an enveloping type of worm gear with number of gear teeth less than 24;
an enveloping part of split worm having a screw thread engaged by a tooth on a worm gear;
wherein said enveloping angle of said worm is greater than 15 degrees for one revolution of said thread of said enveloping worm so that said thread extends from top of the said worm gear to periphery of said worm gear,
means for rotating said split worm about its axis of rotation relative to said worm gear;
wherein said split worm and said worm gear are self locking against driving from said worm gear;
said worm gear being connected to one member of a differential gear set;
wherein two other members of said differential gear set provide an input and an output;
wherein said means for rotating said split worm about its axis of rotation provides unlocking motion of said split worm.

10. The transmission device as recited in claim 9 wherein said differential gear set is a differential comprising two sun gears with one sun gear connected to said worm gear.

11. The transmission device as recited in claim 9 wherein said differential gear set is a differential comprising a ring gear and a sun gear with the sun gear connected to said worm gear.

12. The transmission device as recited in claim 9 wherein said differential gear set is a differential comprising a sun gear and a ring gear with the ring gear connected to said worm gear.

13. The transmission device as recited in claim 9, wherein said differential gear set is a differential comprising two sun gears with a carrier of the differential connected to said worm gear.

14. The transmission device as recited in claim 9 wherein said differential gear set is a differential comprising a sun gear and ring gear with a carrier of the differential connected to said worm gear.

15. The transmission device as recited in claim 9 wherein said differential gear set is a bevel differential with one bevel gear connected to said worm gear.

16. The transmission device as recited in claim 9 wherein said differential gear set is a bevel differential with a carrier connected to said worm gear.

* * * * *